US012609477B2

(12) United States Patent
Lin

(10) Patent No.: US 12,609,477 B2
(45) Date of Patent: Apr. 21, 2026

(54) PROTECTION DEVICE FOR SOCKET SAFETY SHUTTER

(71) Applicant: WENZHOU HUAYA ELECTRIC CO., LTD, Leqing City (CN)

(72) Inventor: Yunhua Lin, Leqing City (CN)

(73) Assignee: WENZHOU HUAYA ELECTRIC CO., LTD, Leqing City (CN)

( * ) Notice: Subject to any disclaimer, the term of this patent is extended or adjusted under 35 U.S.C. 154(b) by 359 days.

(21) Appl. No.: 18/450,935

(22) Filed: Aug. 16, 2023

(65) Prior Publication Data

US 2024/0356266 A1 Oct. 24, 2024

(30) Foreign Application Priority Data

Apr. 18, 2023 (CN) ......................... 202320856409.8

(51) Int. Cl.
*H01R 13/453* (2006.01)

(52) U.S. Cl.
CPC ................................ *H01R 13/4534* (2013.01)

(58) Field of Classification Search
None
See application file for complete search history.

(56) References Cited

U.S. PATENT DOCUMENTS

2024/0195107 A1* 6/2024 Zhang .................... H01R 24/78

FOREIGN PATENT DOCUMENTS

CN 204216280 U 3/2015

* cited by examiner

*Primary Examiner* — Ross N Gushi
(74) *Attorney, Agent, or Firm* — MUNCY, GEISSLER, OLDS & LOWE, P.C.

(57) ABSTRACT

A protection device for a socket safety shutter includes a device body having a boss; a reinforcing plate is arranged on one side of the boss, and is integrated with the boss; a limiting baffle plate is arranged on one side surface of the device body; and the limiting baffle plate is of a bent structure. The reinforcing plate is arranged on one side of the boss, so that direct contact between a side surface of the boss and a plug is avoided, which does not affect the intensity of the boss. In addition, the limiting baffle plate of the bent structure is arranged. The original limiting baffle plate is a straight plate, which may shake greatly when a protection plate I of the limiting baffle plate moves. Therefore, using the bent L-shaped structure can reduce shaking, and a volume of the device body is reduced on the original basis.

6 Claims, 1 Drawing Sheet

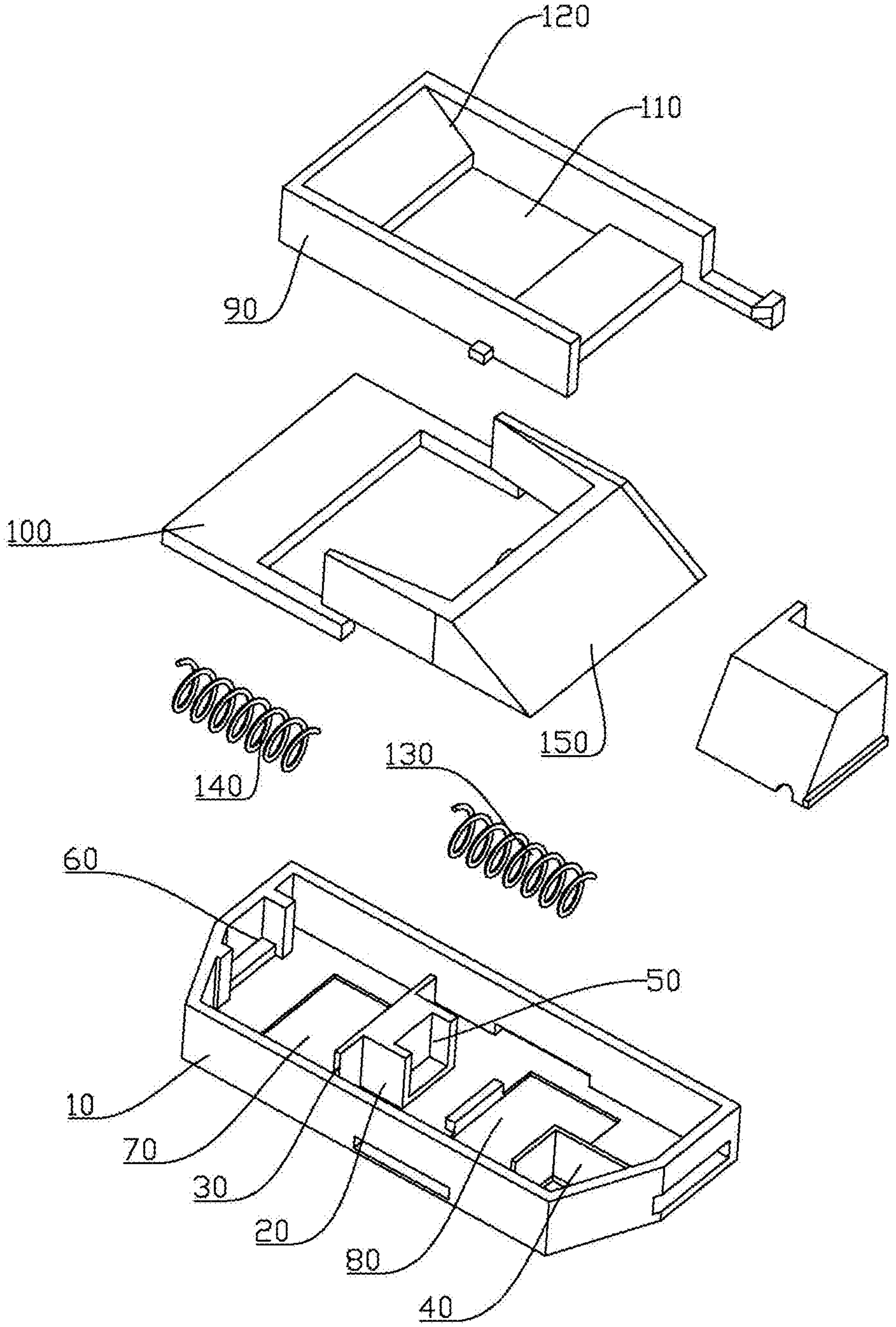
120
110
90
100
150
140
130
60
50
10
70
30
20
80
40

PROTECTION DEVICE FOR SOCKET SAFETY SHUTTER

TECHNICAL FIELD

The present disclosure belongs to the technical field of socket safety shutters, and more particular to, a protection device for a socket safety shutter.

BACKGROUND

Sockets are electrical accessory products frequently used in daily life. A core component of the same type of existing socket products is usually composed of a safety shutter slip sheet, reset springs, a buckle, and a back seat (namely, to place a conductive component). Two plastic plates closed towards each other are arranged in the middle of a jack of a power socket. The plastic plates are opened towards two sides by a forward external force to expose a power jack. After the external force disappears, the reset springs on both sides of the plastic plates push the plastic plates to close the power jack. The opening manner of this device is too simple. When a person, particularly a child, carelessly plugs a finger or a conductor into the jack of this power socket, it is easy to open a safety shutter, and the body will be in contact with electricity, which poses a great potential safety hazard.

Chinese patent CN204216280U discloses a novel protection device for a socket safety shutter, including a device body, provided with a square boss in the middle. A limiting baffle plate protrudes from one inner side surface, and a first spring slot and a second spring slot are respectively formed in the square boss and the other inner side surface. The protection device further includes a stopper mechanism, including a left stopper and a right stopper. An inclined plug board protrudes out of the front end of the left stopper, and a groove is formed in the middle of the right stopper. The right stopper surrounds the left stopper, and the inclined plug board is plugged into the groove. An inner side of the left stopper and a rear side of the right stopper are respectively provided with a first spring and a second spring. The first spring and the second spring are respectively clamped in the first spring slot and the second spring slot. Slopes are respectively arranged at spring fixing ends of the left stopper and the right stopper. According to this disclosure, the left stopper and the right stopper are arranged in the device body. The slopes on the left stopper and the right stopper block two jacks. Only when there are objects simultaneously plugged into the two jacks, the two slopes simultaneously move towards the same side to open channels of the jacks to achieve powering on. When a plug is plugged into the jacks, the plug would be in contact with the square boss. If the plug is plugged and unplugged for many times, the boss will be worn, leading to low intensity. Furthermore, a volume of the device body is reduced on the original basis.

SUMMARY

The present disclosure aims to provide a protection device for a socket safety shutter, to solve the above technical problems.

In order to achieve the above purpose, the present disclosure provides the following technical solution:

A protection device for a socket safety shutter includes a device body, wherein the device body is provided with a boss; a reinforcing plate is arranged on one side of the boss, and is integrated with the boss; a limiting baffle plate is arranged on one side surface of the device body; and the limiting baffle plate is of a bent structure.

In a further setting of the present disclosure, a first spring slot is formed in the boss; a second spring slot is formed in the other side surface of the device body; and the first spring slot and the second spring slot have same orientations.

In a further setting of the present disclosure, a first jack and a second jack are formed in the device body; the first jack and the second jack are located on two sides of the boss; a protection plate I and a protection plate II are arranged in the device body; and the protection plate I and the protection plate II are slidably arranged in the device body to close or open the first jack and the second jack.

In a further setting of the present disclosure, a groove is formed in the protection plate I; an inclined board I is arranged in the groove; a reset spring I is arranged between the protection plate I and the second spring slot; a reset spring II is arranged between the protection plate II and the first spring slot; an inclined board II is arranged on one side of the protection plate II away from the boss; and the inclined board I and the inclined board II close or open the first jack and the second jack.

In a further setting of the present disclosure, the device body has a wall thickness of 1 mm to 2 mm.

In a further setting of the present disclosure, the device body has a height of 10 mm at most.

In a further setting of the present disclosure, the device body has a length of 30 mm at most.

The present disclosure has the beneficial effects that: The reinforcing plate is arranged on one side of the boss, so that direct contact between a side surface of the boss and a plug is avoided, which does not affect the intensity of the boss. In addition, the limiting baffle plate of the bent structure is arranged. The original limiting baffle plate is a straight plate, which may shake greatly when the protection plate I of the limiting baffle plate moves. Therefore, using the bent L-shaped structure can reduce shaking.

BRIEF DESCRIPTION OF THE DRAWINGS

The FIGURE is a schematic exploded diagram of an embodiment of the present disclosure.

Numerals in the drawings: 10: device body; 20: boss; 30: reinforcing plate; 40: limiting baffle plate; 50: first spring slot; 60: second spring slot; 70: first jack; 80: second jack; 90: protection plate I; 100: protection plate II; 110: groove; 120: inclined board I; 130: reset spring I; 140: reset spring II; and 150: inclined board II.

DETAILED DESCRIPTION OF THE EMBODIMENTS

The implementations of the present disclosure will be described in detail in conjunction with embodiments, so as to fully understand and implement a realizing process of how the present disclosure applies technical means to solve technical problems and achieve technical effects.

As shown in the FIGURE, the present disclosure discloses a protection device for a socket safety shutter, including a device body 10. The device body 10 is provided with a boss 20. A reinforcing plate 30 is arranged on one side of the boss 20, and is integrated with the boss 20. A limiting baffle plate 40 is arranged on one side surface of the device body 10. The limiting baffle plate 40 is of a bent structure.

A first spring slot 50 is formed in the boss 20. A second spring slot 60 is formed in the other side surface of the device body 10. The first spring slot 50 and the second spring slot have same orientations.

A first jack 70 and a second jack 80 are formed in the device body 10. The first jack 70 and the second jack 80 are located on two sides of the boss 20. A protection plate I 90 and a protection plate II 100 are arranged in the device body 10. The protection plate I 90 and the protection plate II 100 are slidably arranged in the device body 10 to close or open the first jack 70 and the second jack 80.

A groove 110 is formed in the protection plate I 90. An inclined board I 120 is arranged in the groove 110. A reset spring I 130 is arranged between the protection plate I 90 and the second spring slot 60. A reset spring II 140 is arranged between the protection plate II 100 and the first spring slot 50. An inclined board II 150 is arranged on one side of the protection plate II 100 away from the boss 20. The inclined board I 120 and the inclined board II 150 close or open the first jack 70 and the second jack 80.

The device body 10 has a wall thickness of 1 mm to 2 mm.

The device body 10 has a height of 10 mm at most.

The device body 10 has a length of 30 mm at most.

In the present disclosure, the reinforcing plate 30 is arranged on one side of the boss 20, so that direct contact between a side surface of the boss 20 and a plug is avoided, which does not affect the intensity of the boss 20. In addition, the limiting baffle plate 40 of the bent structure is arranged. The original limiting baffle plate 40 is a straight plate, which may shake greatly when the protection plate I 90 of the limiting baffle plate moves. Therefore, using the bent L-shaped structure can reduce shaking.

For example, certain words are used in the specification and claims to refer to specific assemblies. Those skilled in the art should understand that hardware manufacturers may use different names to refer to the same assembly. This specification and claims do not use differences in names as a way to distinguish assemblies, but use differences in functions of assemblies as a criterion for distinguishing. If "including" mentioned in the entire specification and claims is an open term, it should be interpreted as "including but not limited to". "Approximately" means that within an acceptable error range, those skilled in the art can solve the technical problem within a certain error range and basically achieve the technical effect.

It should be noted that the terms "including", "include", or any other variation thereof are intended to cover a non-exclusive inclusion, so that an article or system that includes a list of elements includes those elements and further includes other elements not expressly listed or further includes elements inherent to such an article or system. Without more constraints, an element preceded by "includes a . . . " does not preclude the existence of additional identical elements in the article or system that includes the element.

The above description shows and describes several preferred embodiments of the present disclosure. However, as mentioned above, it should be understood that the present disclosure is not limited to the form disclosed herein and should not be regarded as the exclusion of other embodiments, but can be used for various other combinations, modifications, and environments. The present disclosure can be changed within the conceived scope of the present disclosure by means of the above teachings or technologies or knowledge in the related art. The modifications and changes made by those skilled in the art do not depart from the spirit and scope of the present disclosure, and shall all fall within the protection scope of the appended claims of the present disclosure.

What is claimed is:

1. A protection device for a socket safety shutter, comprising a device body, wherein the device body is provided with a boss; a reinforcing plate is arranged on one side of the boss, and is integrated with the boss to avoid direct contact between the side surface of the boss and a plug, thereby not affecting the intensity of the boss; a limiting baffle plate is arranged on one side surface of the device body, and the limiting baffle plate is a bent L-shaped structure for reducing the shaking degree of the protection plate I during movement, and the bent L-shaped structure is different from the original straight-plate type limiting baffle plate; a first spring slot is formed in the boss, and a second spring slot is formed in the other side surface of the device body, and the first spring slot and the second spring slot have the same orientations.

2. The protection device for the socket safety shutter according to claim 1, wherein a first jack and a second jack are formed in the device body; the first jack and the second jack are located on two sides of the boss; a protection plate I and a protection plate II are arranged in the device body; and the protection plate I and the protection plate II are slidably arranged in the device body to close or open the first jack and the second jack.

3. The protection device for the socket safety shutter according to claim 2, wherein a groove is formed in the protection plate I; an inclined board I is arranged in the groove; a reset spring I is arranged between the protection plate I and the second spring slot; a reset spring II is arranged between the protection plate II and the first spring slot; an inclined board II is arranged on one side of the protection plate II away from the boss; and the inclined board I and the inclined board II close or open the first jack and the second jack.

4. The protection device for the socket safety shutter according to claim 1, wherein the device body has a wall thickness of 1 mm to 2 mm.

5. The protection device for the socket safety shutter according to claim 4, wherein the device body has a height of 10 mm at most.

6. The protection device for the socket safety shutter according to claim 5, wherein the device body has a length of 30 mm at most.

* * * * *